May 15, 1962 H. M. SCHLICKE 3,035,237
FEED-THROUGH CAPACITOR
Filed March 10, 1958 5 Sheets-Sheet 1

INVENTOR
HEINZ M. SCHLICKE

BY Quarles, Fox, Seidel,
Bateman & Hoar

ATTORNEYS

May 15, 1962 H. M. SCHLICKE 3,035,237
FEED-THROUGH CAPACITOR

Filed March 10, 1958 5 Sheets-Sheet 2

INVENTOR
HEINZ M. SCHLICKE
BY Quarles, Fox, Seidel,
Bateman & Hoar
ATTORNEYS

May 15, 1962

H. M. SCHLICKE 3,035,237

FEED-THROUGH CAPACITOR

Filed March 10, 1958

INVENTOR
HEINZ M. SCHLICKE

BY Quarles, Fox, Seidel,
Bateman & Hoar

ATTORNEYS

United States Patent Office 3,035,237
Patented May 15, 1962

3,035,237
FEED-THROUGH CAPACITOR
Heinz M. Schlicke, Fox Point, Wis., assignor to Allen-Bradley Company, Milwaukee, Wis., a corporation of Wisconsin
Filed Mar. 10, 1958, Ser. No. 720,266
10 Claims. (Cl. 333—79)

This invention relates to capacitors for very and ultra-high radio frequencies, and particularly to capacitors used as low pass filters for providing low reactance paths to ground for such frequencies when they are superimposed upon low frequency or direct current supply leads.

In modern television receiving equipment and in other high frequency equipment for military and similar purposes, it is customary to house frequency generators or amplifiers in metallic shields so that extraneous radiation which might cause interference in adjacent apparatus is prevented. In supplying low frequency alternating currents for filament heating, for example, or in supplying D.C. potentials for plate and grid circuits, considerable high frequency current will leave the shielding enclosure by traveling along such supply leads and will be radiated spuriously outside of the shield. As a solution to this problem, it has been proposed that capacitors be employed to form a high frequency, low reactance path to ground at the shielding enclosure. It is customary to employ these capacitors as feed-throughs at the shield boundaries, with one electrode of the capacitor connected to the supply line and its other electrode connected to the shielding enclosure.

As is known, at high frequencies of the order of 100 to 1000 megacycles, stray inductive reactance is easily introduced into a circuit. This is because inductive reactance increases in direct proportion to the product of frequency and inductance, and at frequencies of the above order a very minute inductance will produce a substantial inductive reactance. Thus a short length of straight wire at, for example, 1000 megacycles may have a substantial inductive reactance, and if this inductive reactance is closely proximate to a capacitive reactance a network of inductance and capacitance will result. In addition to inductance in leads to the capacitor, the capacitor electrodes themselves have inductance distributed along their length, which, together with the shunting capacitance of the capacitor proper creates, at certain frequencies, inductive reactance in shunt with the capacitive reactance and at certain frequencies parallel resonant circuits result, giving undesirably high impedances which interfere with accomplishment of the objective of creating a low reactance path to ground. These effects are multiplied as the farad value of the capacitance is increased.

For the foregoing reasons, a simple capacitor connected between a lead carrying frequencies of the order mentioned and ground behaves as a four terminal network having both inductive and capacitive reactance, rather than as a simple two terminal capacitive reactance as is desired.

In my copending application, Serial No. 587,692, filed May 28, 1956, now Patent No. 3,023,383, there is disclosed a feed-through capacitor utilizing discoidal high dielectric constant ceramic capacitors mechanically cascaded with ferri-magnetic material disposed in inductive relationship to the connections to and between the disc type capacitors. As is brought out in the aforesaid application, the introduction of ferri-magnetic loading between capacitors substantially dampens the inductive reactance which would normally result from the leads connecting successive capacitors and produces instead an impedance that is primarily resistive in the frequency range contemplated. The use of multiple discoidal capacitors with interspaced ferri-magnetic material effectively avoids cavity resonance effects within the ceramic dielectric because capacitors can be utilized having the largest dimension of the dielectric small enough to cause the lowest cavity resonance frequency to occur at 1500 megacycles or upwards.

While such discoidal type feed-through capacitors function well electrically and mechanically, there are certain advantages in using a tubular ceramic capacitor having its electrodes concentrically disposed on the inner and outer cylindrical surfaces of the tube. Such tubular capacitors are less expensive to produce as they involve fewer operations and may conveniently be produced without external housings or other means for fixing the elements together as a unit.

In tubular capacitors, however, it is necessary to utilize a ceramic dielectric having a substantial axial length in order to obtain sufficient capacitance to provide a low reactance path at high frequencies. Since high dielectric constant ceramic bodies have a natural resonant mode approximately 25 to 100 times less than the corresponding mode in an air cavity, cavity induced resonances in the dielectric of tubular capacitors occur within the frequency range of application, even though the dielectric has a mechanical length much less than a half wave length in air. As the objective of using a capacitance to provide a low reactance path to ground inherently depends upon the maintenance of the lowest possible impedance in the range of application, any parallel resonance will defeat the purpose, whether it be a resonance within the cavity formed by the dielectric body or a resonance resulting from the distributed inductance of the capacitor electrodes or the feed-through line. If the feature of simplicity and cheapness is to be retained in tubular capacitors, breaking them into multiple tubes having cavity resonances outside of the range of application is not the best answer because such multiple tubes would have to be held together by a housing or some other means, which means added expense. Further, a housing creates another highly undesirable source of additional inductance, which, together with the capacitor sections, produces undesired parallel resonances.

The tubular capacitors heretofore used as feedthroughs for domestic television receivers have exhibited pronounced parallel resonances at frequencies as low as 300 megacycles, and, generally such capacitors pass through 2 or 3 broad band parallel resonant points between 100 and 1000 megacycles. As a result of this network behavior of an intended pure capacitance, the transfer impedance of tubular capacitors between 100 and 1000 megacycles is generally 5 to 30 times or more greater than its theoretical or calculated value. Stated another way, the effective capacitance of previous tubular capacitors of the usual values of 1000 pf. to 2000 pf. used in television receivers is considerably less than their nominal values in the frequency range of application. Increasing the nominal capacitance value is ineffective as this requires using a larger dielectric body, which lowers the cavity resonance frequency and compounds cavity resonance effects. Similarly, connecting multiple capacitors in series is ineffective as this introduces conductor inductance which increases the effect of network resonances.

It is the discovery of this invention that the foregoing disadvantages of tubular capacitors, that is network and dielectric body resonance effects can be reduced to tolerable levels by judicious interruption of the cylindrical electrodes and by the proper application of ferri-magnetic bodies with respect to the electrode interruptions.

The primary object of the invention is to improve the high frequency filtering effect of tubular capacitors without sacrificing their simplicity and inexpensiveness and to provide tubular capacitors having 1000 to 10,000 times lower effective shunt impedance than previous tubular capacitors. Further objects and advantages of the invention are brought out in the following detailed description and in the drawings, in which:

Figure 1:
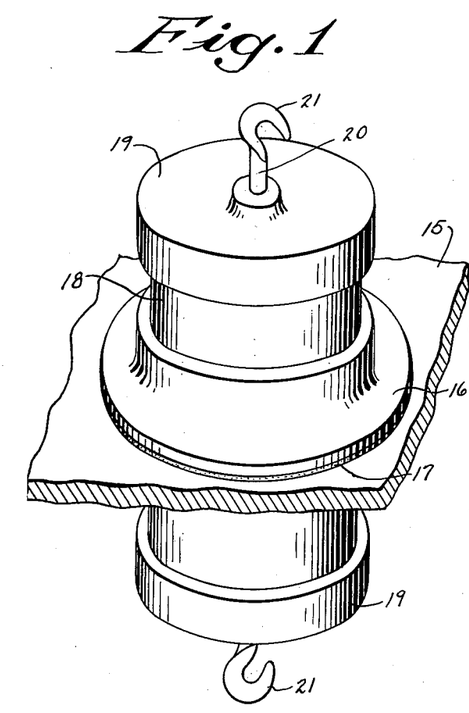
FIG. 1 illustrates in perspective a feed-through capacitor embodying the principles of the invention and utilizing ferri-magnetic material on the inside of the capacitor.

Referring to the details of the drawings, FIG. 1 is a perspective illustration of a feed-through capacitor embodying the principles of the invention, mounted in operative position upon a portion 15 of a shielding enclosure. The capacitor mounting flange 16 is joined mechanically and electrically to the shield by a solder film, a portion of which is visible at 17. It may be observed in FIG. 1 that the capacitor is a unitary structure having a cylindrical body 18, end caps 19, and a feed-through conductor 20, provided with solder lugs 21 for attachment to the circuit with which it is used.

Figure 2:
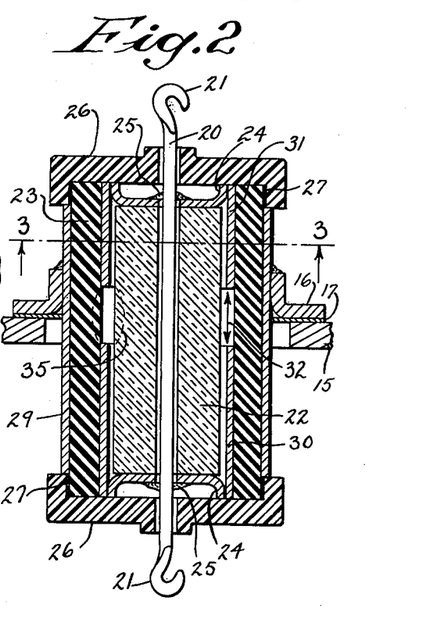
FIG. 2 is an axial sectional view of the capacitor in FIG. 1.
Figure 3:
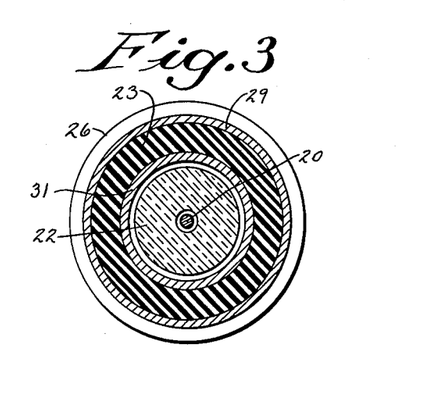
FIG. 3 is a transverse sectional view taken on the plane indicated by line 3—3 in FIG. 2.

In FIGS. 2 and 3 the internal construction of the capacitor is illustrated. Beginning at the axis of the capacitor, it may be seen that the feed-through conductor 20 is surrounded by a cylindrical sleeve 22 of ferri-magnetic material having an internal bore slightly larger than the conductor 20, so that the latter may be passed therethrough. Surrounding the ferri-magnetic sleeve is a second cylindrical sleeve 23 which is preferably formed from a ceramic having a high dielectric constant. The aforementioned cylindrical sleeves and feed-through conductor are maintained in fixed relationship by a pair of crimped metallic washers or spiders 24 disposed to grip the internal wall of the ceramic cylinder 23 and the circular end faces of the ferri-magnetic sleeve 22. The feed-through conductor 20 is secured mechanically and electrically to each of the spiders 24 by a pair of solder connections 25. End caps 26 of an insulating material of low dielectric constant such as steatite are disposed at each end of the unit and fixed to the ceramic sleeve as at 27 by an adhesive. Connection to circuit elements is provided for by a flanged metallic sleeve 16 and solder lugs 21.

The capacitor elements are formed on the inner and outer surfaces of ceramic sleeve 23 by electrodes 29 on the outer surface and 30 and 31 on the inner surface. It may be observed that outer electrode 29 extends continuously for substantially the entire length of ceramic sleeve 23, and forms a common electrode for the separate capacitors formed by inner electrodes 30 and 31. It may also be observed that there is a substantial gap 32 between inner electrodes 30 and 31, which will be discussed subsequently in greater detail. When incorporated into a circuit the capacitance of the two capacitors is additive as they are parallel connected, i.e., common electrode 29 is connected to chassis or ground through flanged sleeve 16 and electrodes 30 and 31 are each connected to feed-through conductor 20 through spiders 24 and solder connection 25.

As mentioned previously, stray inductance is easily introduced into a circuit at frequency ranges from 100 to 1000 megacycles, and neglecting for a moment the presence of ferri-magnetic sleeve 22, the capacitor of FIG. 2 would exhibit pronounced inductance because of the presence of feed-through lead 20 and the axially distributed inductance of electrodes 29, 30 and 31. Further, if inner electrodes 30 and 31 were not interrupted by a gap as at 32, but were continuous as is outer electrode 29, the ceramic sleeve 23 would behave largely as a cavity with zero impedance walls, and would exhibit pronounced parallel resonances having modes of relatively low frequencies, depending upon the dielectric constant of the ceramic. The combined effect of stray inductance and solid body parallel resonance, greatly reduces the filtering effect, or stated another way, greatly reduces the effective capacitance of a capacitor at very and ultra-high frequencies by substantially increasing its transfer impedance.

The ceramic sleeve 23 may be formed of socalled titanate ceramic substances such as barium titanate, magnesium titanate or other similar polycrystalline ceramic material having a high dielectric constant.

The electrodes 29, 30 and 31 are preferably formed of metal intimately bonded to the ceramic sleeve 23, such as may be provided by firing silver paste in place. Further dampening of cavity resonances in the ceramic sleeve 23 may be accomplished by mixing with the silver paste prior to firing about 40% by weight of a lossy ferrite material such as nickel-zinc ferrite.

The ferri-magnetic sleeve 22 is preferably formed of so-called high permeability polycrystalline ceramic material commonly referred to as ferrite. Such ferrites are prepared at high temperatures from oxides of iron and of certain other divalent or polyvalent metals. Such materials will, hereafter, be referred to simply as ferrites.

As is pointed out in my copending application, Serial No. 494,857, entitled "Electrical Wave Filter Apparatus," filed March 17, 1955, I have discovered that such ferrites have a very useful function at frequencies above their $Q=1$ point, that is above the frequency at which gyromagnetic and domain wall resonances become predominant in such ferrites. At frequencies below the $Q=1$ frequency ferrites behave predominantly inductively, as is expected of magnetic materials. However, above the $Q=1$ frequency, the effect of a ferrite is predominantly resistive and its impedance has a very slight inductive component.

Thus the ferrite of sleeve 22 is selected to operate at a frequency higher than that at which $Q=1$ or, stated another way, is selected to be "lossy" in its frequency range of application. By disposing the ferrite sleeve 22 closely adjacent to feed-through lead 20 the ferrite intercepts the magnetic field surrounding the lead and effectively absorbs the field due to gyromagnetic and domain wall resonances in the ferrite. As previously pointed out, the effect upon the high frequency currents traveling along lead 20 is predominantly resistive, while D.C. or low frequency alternating current traveling on lead 20 is not affected.

A portion of the outer cylindrical wall of ferrite sleeve 22 is closely contiguous to the gap 32 between electrodes 30 and 31. While there is no D.C. potential difference between the condenser electrodes 30 and 31, a considerable high frequency electrical field exists between their adjacent circular edges, which field exists partly in the ceramic sleeve and partly outside the ceramic, as shown by the dotted lines at 35 in FIG. 2. The tendency is for this field to act as a capacitance in shunt with the magnetically induced resistive element consisting of conductor 20 and ferrite slug 22, such shunt capacitance reducing the total effective capacitance of the tubular unit.

There is present in dielectric sleeve 23 a substantial electric field due to the charges on electrodes 30 and 31 with respect to electrode 29. Since an electric field is always accompanied by a corresponding magnetic field, the dielectric sleeve 23 will tend to oscillate as a cavity and, as previously pointed out, a tubular capacitor of the usual television receiver sizes will have one or more broad band resonant modes between 100 and 1000 megacycles. The interruption of one of the cylindrical electrodes as at 32 creates an abrupt transition in cavity wall impedance, however. Thus, looking from a point within the dielectric, the exterior wall of the cavity will have substantially infinite impedance to a traveling wave if the cavity wall is surrounded by air, a substantially zero impedance if the wall is composed of intimately bonded silver, and an intermediate impedance if the intimately bonded silver contains an intermixed material of higher impedance such as ferrite. A change in wall impedance changes the angle at which waves are reflected from the wall and hence the mode of the cavity. Thus the interruption of electrodes 30 and 31 by the gap 32 serves to divide the ceramic sleeve into two distinct cavities of zero cylindrical boundary impedance, each having its own resonant modes.

The location of electrode gap 32, or stated another way, the relative length of electrodes 30 and 31 will effect the transfer impedance of the capacitor. If the aforesaid electrodes are of the same length, the cavity resonances and their harmonics will be additive and thus reduce the filtering effect of the capacitor. If, on the other hand, electrode lengths are chosen that create cavities having different resonant frequencies, the impedance increase due to parallel cavity resonance may be minimized. In the embodiment of FIGS. 1, 2 and 3, which is much enlarged for illustration, the capacitor has a nominal value of 8000 pf. and the electrodes 30 and 31 have a length ratio of 1.5 to 1.0.

In addition to the electric field between the adjacent circular ends of electrodes 30 and 31, as illustrated at 35, the cavity resonances within ceramic sleeve 23 will produce electric and magnetic fields across the gap 32. All of these fields enter the ferrite sleeve 22, and since their frequencies are within the domain wall and gyromagnetic resonance range of the ferrite, the ferrite acts as a resistance to the fields, or weakens or partially absorbs them. Thus, the capacitive coupling between the adjacent ends of electrodes 30 and 31 is dampened, as is the magnitude of the resonances in ceramic sleeve 23. Thus, ferrite sleeve 22 performs the multiple functions of dampening inductance along feed-through conductor 20, dampening capacitive coupling between adjacent ends of electrodes 30 and 31 and dampening solid body cavity resonances within ceramic sleeve 23.

The length of gap 32 should be sufficient to permit coupling of ferrite sleeve 22 to the various fields across the gap to permit incorporation of the ferrite losses. While the gap length is not highly critical, it has been found that in an embodiment of the type illustrated in FIGS. 1, 2 and 3 in which the ceramic sleeve is of average thickness, a gap length of approximately twice the ceramic sleeve thickness is satisfactory. This relationship is also effective for thin wall ceramic sleeves, but in the case of thick wall sleeves other arrangements are more satisfactory, as is discussed subsequently ing reater detail.

Some electric field will be present around the annular ends of ceramic sleeve 23, and in order to introduce losses which will prevent inductive coupling of this field with adjacent circuitry, lossy end caps 26 are provided, which may be of a low dielectric constant material such as steatite. If desired all voids may be sealed or vacuum impregnated with an epoxy resin.

For convenience in distinguishing the various embodiments, the type illustrated in FIGS. 1, 2 and 3 will hereafter be referred to as "ferrite inside," that is a unit in which the ferri-magnetic material is located on the inside of the capacitor sleeve. Conversely, the type illustrated in FIGS. 4 and 5 in which the ferri-magnetic material is located on the outside of the capacitor sleeve will be referred to as "ferrite outside."

Figure 4:
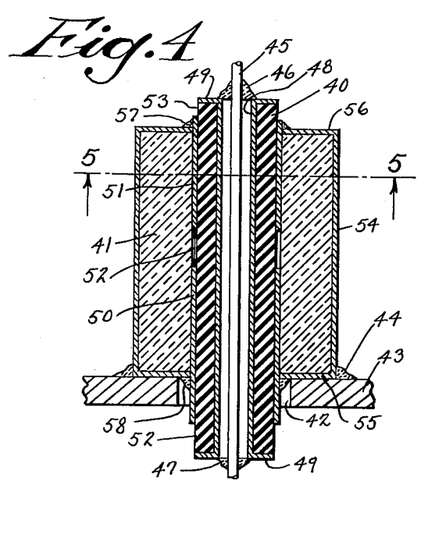
FIG. 4 illustrates in axial section a different embodiment of the invention in which the ferri-magnetic material is disposed on the outside of the capacitor.
Figure 5:
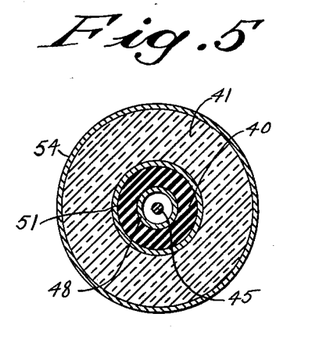
FIG. 5 is a transverse sectional view taken on the plane indicated by line 5—5 in FIG. 4.

Referring to the details of FIGS. 4 and 5, the unit illustrated therein is an inexpensive feed-through capacitor comprising only two parts, a ceramic tubular sleeve 40 and a tubular sleeve of ferri-magnetic material 41. For a clearer understanding of its application, the capacitor is shown mounted in an aperture 42 in a shielding enclosure 43, being fixed in such position by a solder bead 44. In applying the capacitor to a circuit a feed-through lead 45 is shoved through the inner bore of the ceramic sleeve 40 and mechanical and electrical connection is made by solder at the upper extremity of the capacitor at 46 and at the lower extremity at 47.

The capacitor is formed in two sections as previously explained, a common electrode 48 being disposed around the inner bore of ceramic tube 40 and running the full length thereof. Said electrode runs continuosly not only through the bore of tube 40, but also extends outwardly over the ends thereof in annular areas 49 which form a metallic area for soldering feed-through conductor 45 to the inner capacitor electrode. A pair of outer electrodes 50 and 51 separated by a gap 52 are disposed around the outer cylindrical surface of ceramic tube 40. In order to provide insulation between the electrodes, spaces are left at the lower and upper ends of the tube at 52 and 53 respectively. The electrodes are preferably intimately bonded to the ceramic tube as by firing silver paste in place, which paste may include material such as ferrite as previously explained.

Around the tubular capacitor 40 is disposed a cylindrical body 41 of ferri-magnetic material having the gyromagnetic resonance and domain wall loss properties previously explained. Said body 41 is rigidly mechanically secured to the capacitor tube 40 as by fritting. The outer cylindrical surface of the ferrite body 41 is metallized as by firing silver paste in place or by solder dipping to provide a coating 54, which extends over the annular ends of the body at 55 and 56. The inner bore of the ferrite is left bare, particularly the portion adjacent electrode gap 52. Electrical connection to electrodes 50 and 51 is made by solder at 57 and 58 respectively, thence along the metallized surface 54 of ferrite body 41 to the chassis connection point 44.

The analogy between the ferrite inside construction of FIGS. 1, 2 and 3 and the ferrite outside construction of FIGS. 4 and 5 is not immediately apparent as the coupling between feed-through conductor 45 and ferrite body 41 is remote. It is thought, however, that the close proximity and concentric relationship of feed-through conductor 45 and inner electrode 48 cause the fields around conductor 45 to be confined principally to the ceramic tube 40, which is ferrite loaded through the electrode gap 52. The dampening of solid body cavity resonances within ceramic tube 40 and the capacitive coupling across gap 52 are dampened by the ferrite body 41 as previously explained.

In order to obtain a comparable nominal capacitance value with the ferrite outside construction of FIGS. 4 and 5, the ceramic tube 40 will normally have a thinner wall than the ceramic tube of FIGS. 1, 2 and 3 which must have a larger bore diameter to accommodate the ferrite inside. Being thus a "thin wall" tube comparatively, the electrode gap 52 in FIG. 4 is preferably about twice the thickness of ceramic tube 40. As in FIGS. 1, 2 and 3, the lengths of electrodes 50 and 51 are selected so that the cavity resonant frequencies in the upper and lower sections of ceramic tube 40 and their harmonics will not be additive and, as illustrated, the lengths of inner electrodes 50 and 51 have a length ratio of approximately 1.5 to 1.

Figure 6:
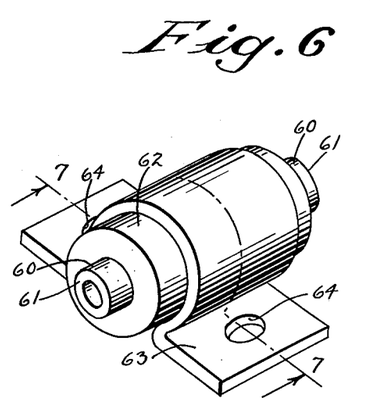
FIG. 6 is a perspective view of the embodiment of FIGS. 4 and 5 with a modified mounting means which converts the embodiment from a feed-through capacitor to a stand-off capacitor.
Figure 7:
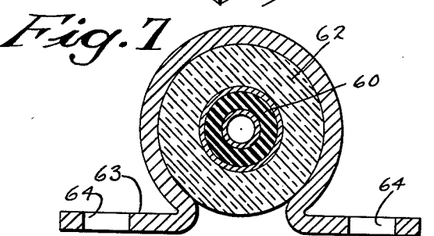
FIG. 7 is a transverse sectional view taken on the plane indicated by line 7—7 in FIG. 6.

In FIGS. 6 and 7 there is illustrated a ferrite outside capacitor modified into the form known as a "stand-off" capacitor. This type of unit is used in very and ultra-high frequency circuits as a means for providing a low impedance path to ground at a particular point on the chassis, rather than as a low impedance path at a point of passage through a chassis or shielding enclosure. The illustrated stand-off capacitor comprises a ceramic tube 60 bearing electrodes which may be identical with those illustrated in FIGS. 4 and 5, including a metallized end face 61 comprising a continuation of the inner electrode. The tubular capacitor is surrounded by a tubular ferrite body 62 having a metallized exterior surface which is electrically and mechanically joined to a metallic mounting strap 63. The electrical operation of the embodiment of FIGS. 6 and 7 is identical with the ferrite outside embodiment of FIGS. 4 and 5. Mechanically, the stand-off capacitor is secured to a chassis by means of bolts passed through strap apertures 64, or alternatively the strap may be soldered to the chassis. A lead is passed through the bore in ceramic tube 60 and soldered to both metallized end faces 61 to complete the connection.

Figure 8:
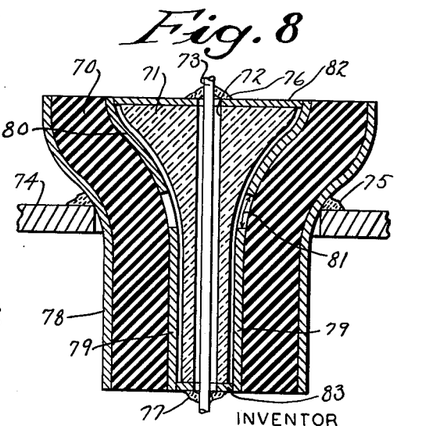
FIG. 8 is an axial sectional view of a further embodiment of the invention utilizing ferri-magnetic material on the inside of a capacitor formed with an integral mounting collar.

FIG. 8 illustrates in axial section an alternative embodiment in the form of a step or shoulder type ferrite inside feed-through capacitor. This unit may be seen to be a simple and inexpensive ferrite inside arrangement with only two parts, a flared ceramic tube 70 bearing capacitor electrodes and a complementary ferrimagnetic insert 71 having a central bore 72 through which a feed-through conductor 73 may be passed. To assist in understanding how the unit is applied, it is shown mounted in an aperture in a shielding enclosure 74, mechanical and electrical connection being accomplished by a solder bead 75. Feed-through conductor 73 is secured mechanically and electrically by solder at the upper entrance 76 to bore 72 and at the lower emergence 77 from the bore.

Capacitor electrodes are formed as previously described, the external electrode 78 being continuous and inner electrodes 79 and 80 being separated by a gap 81. Because of the larger diameter of the upper flared portion of the ceramic tube 70, the linear length of inner electrodes 79 and 80 will not be approximately 1.5 to 1 as in the previously described cylindrical tubular capacitors. The same principle governs their length, however, that is the resonant modes and harmonics of the cavities created in the ceramic bounded by electrodes 79 and 80 should not be additive. Given this principle, the mechanical dimensions of the tube and the electrical parameters of the dielectric and electrodes, those skilled in the art will be able to calculate the proper electrode length.

The ferrite core 71 may be fixed in place by fritting or by a suitable adhesive such as an epoxy resin. The upper and lower faces of the ferrite core 82 and 83, respectively, are metallized as by firing silver paste in place, with their outer peripheries in electrical contact with inner electrodes 80 and 79, respectively.

Figure 9:
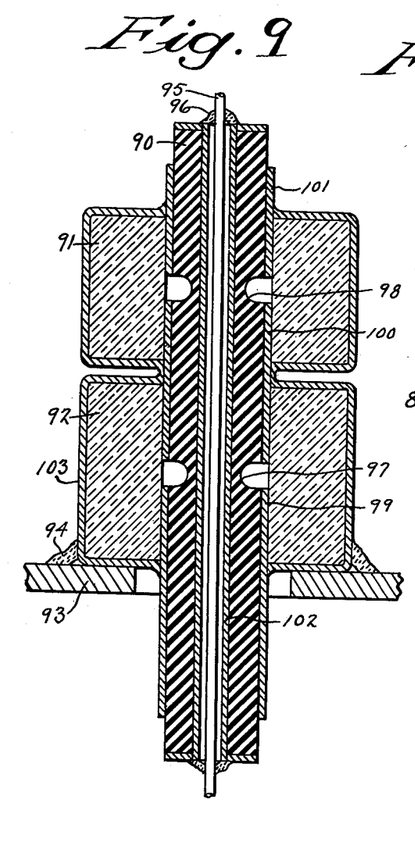
FIG. 9 is an axial sectional view of a further embodiment utilizing the principles of the invention in a thick-walled three section capacitor with multiple ferri-magnetic bodies applied outside of the capacitor.

FIG. 9 illustrates in axial section a ferrite outside embodiment of the invention which has a minimum number of parts and is therefore inexpensive to manufacture, but which may have a larger capacitance value and/or increased mechanical strength and/or increased voltage breakdown resistance. The unit includes a thick wall cylindrical ceramic tube 90 bearing electrodes and upper and lower ferri-magnetic cylinders 91 and 92 respectively, and is illustrated mounted in an aperture in a metallic shield 93, mechanical and electrical attachment being by means of a solder bead 94. A feed-through conductor 95 is passed through the central bore of tube 90 and secured mechanically and electrically by solder 96 at the upper and lower ends of the tube.

As previously pointed out, the electrode gaps utilized in thin or average thickness ceramic tubes may be approximately twice the thickness of the ceramic wall. In thick wall tubes, however, a gap of twice the wall thickness becomes unnecessarily long and increases the size of the filter unit. Accordingly, an alternative gap arrangement is illustrated in thick wall tube 90 in which the gaps between electrodes are effectively lengthened electrically by grooving the ceramic tube as at 97 and 98. The length and depth of the grooves is not highly critical and an axial gap length approximately equal to the thickness of the tube, together with a maximum groove depth approximately equal to ⅔ of the tube thickness is satisfactory. The groove bottom is preferably made U-shaped as illustrated in order to avoid stress raising square corners and consequent fragility in the ceramic tube.

The utilization of grooves such as those at 97 and 98 in FIG. 9 places air between the adjacent edges of the outer capacitor electrodes 99, 100 and 101 and thus lowers the capacitive coupling therebetween. The presence of the air gaps in the ceramic tube also permits very effective coupling of the fields in the gap to ferrite bodies 91 and 92, which function in the manner previously described to dampen parallel resonances. The air gaps serve the further function of providing infinite impedance baffles along the ceramic tube 90, which assist in dividing the tube into separate cavities so that cavity resonances tend to be dampened in the frequency range of application.

Outer electrodes 99, 100 and 101 are of the type previously described and their axial lengths are preferably of the approximate ratio $(1.5)^2$ to 1.5 to 1.0 respectively so that the frequencies of cavity resonance are not additive. Inner electrode 102 is continuous around and through the inner bore of tube 90 and is continued over the end faces of the tube to facilitate soldering to feed-through conductor 95.

Connection to the outer electrodes 99, 100 and 101 is made through a metallized surface 103 on all of the exposed surfaces of ferrite bodies 91 and 92. Said metallized surface is preferably applied by firing silver paste in place. The inner bores of the ferrite cylinders are left bare so that the ferrite may be coupled to the fields in and adjacent to the ceramic tube 90 and its capacitor electrodes.

As an alternative, the tube 90 may be broken into separate sections spaced apart a distance corresponding to the grooves 97 and 98, or may be separated at those points by insulating spacers.

Figure 11:
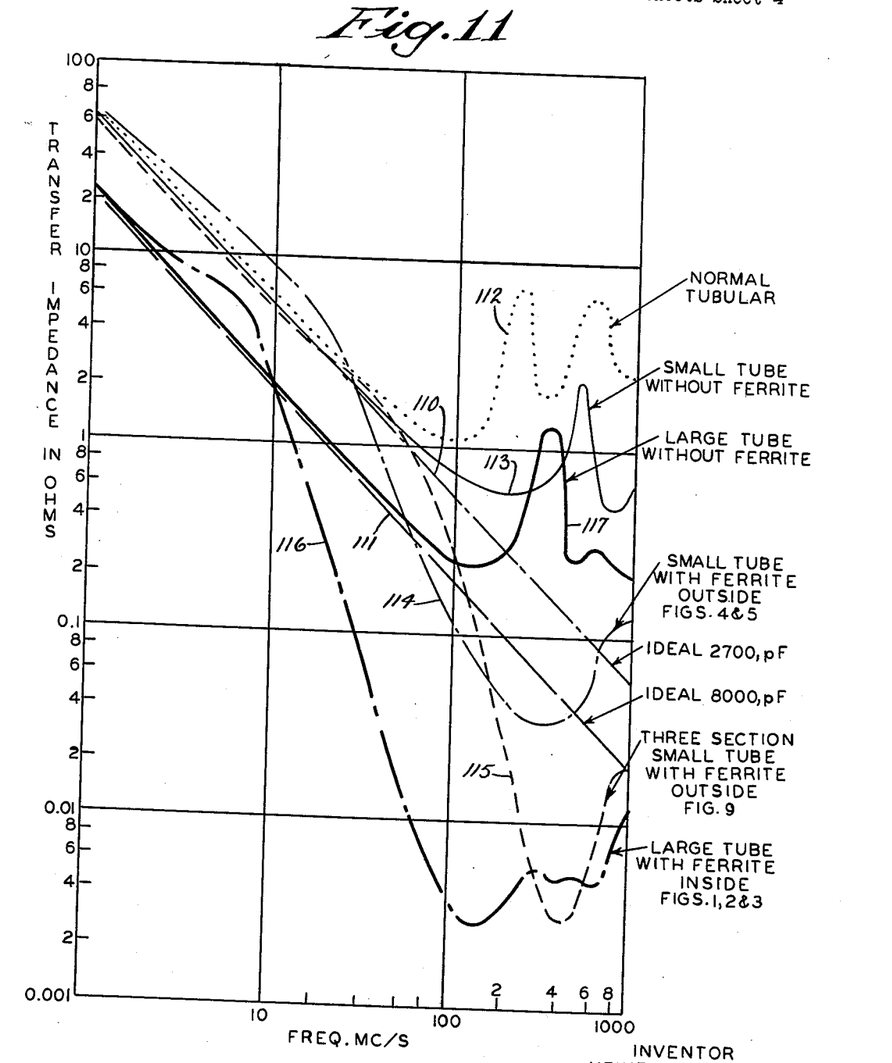
FIG. 11 is a graph of insertion or shunt impedance versus frequency for several of the embodiments of the invention compared with previous tubular capacitors of similar capacitance values.

FIG. 11 is a performance graph of the several embodiments previously described reproduced from actual laboratory tests. Both graph scales are logarithmic, the abscissa being frequency in megacycles and the ordinate being transfer impedance in ohms for the shunt branch of the capacitors, that is, the impedance from feed-through conductor to chassis or ground.

For reference purposes 45° negative slope dashed straight lines representing the calculated impedance or reactance of ideal capacitors have been shown for 2700 pf. at 110 and for 8000 pf. at 111. The dotted line 112 is a graph of the performance of a standard tubular feed-through capacitor having uninterrupted electrodes disposed concentrically on the inner and outer bores of a high dielectric constant ceramic tube. Such capacitor has a nominal capacitance of 2700 pf. and may be seen to perform as an ideal capacitor below about 12 megacycles. Above that frequency, however, the capacitor has a higher impedance than an ideal capacitor, and may be seen to pass through two pronounced parallel resonances at approximately 250 and 600 megacycles. Such a capacitor obviously performs poorly above 100 megacycles and actually acts as a band pass filter, readily passing frequencies proximate to its two parallel resonant frequencies.

The light solid line 113 shows the performance of a small tubular capacitor of the type illustrated in FIG. 4 with the ferrite sleeve omitted. It may be observed that interruption of the capacitor electrodes improves capacitor performance (in comparison to line 112), but that a pronounced parallel resonance occurs at about 500 megacycles. The utilization of ferrite loading vastly improves performance as is shown in the light dash-dot line 114, which represents the performance of the capacitor of FIGS. 4 and 5. Because the ferrite loaded capacitor behaves as a series resonant circuit, its performance is better than that of an ideal capacitor from about 30 megacycles to 600 megacycles. At frequencies higher than 600 megacycles, the capacitor demonstrates some parallel resonant tendencies but the characteristics thereof are very broad due to the properties heretofore mentioned. The capacitor of line 114, compared to the normal tubular capacitor of line 112 at, for example, 250 megacycles, offers a transfer impedance of .04 ohm compared to a transfer impedance of about 7 ohms, or an improvement of about 200 times.

The dashed line 115 illustrates the performance of a three section small tube ferrite outside capacitor, or that illustrated in FIG. 9. It will be observed that its performance is better than those previously described and, at 400 megacycles, it has a transfer impedance of only .003 ohm, compared to a transfer impedance of about 6 ohms for a normal tubular capacitor. The improvement in this instance is approximately 2000 times.

The large tubular capacitors, or those having the ferrite inside, have a larger capacitance because of the larger tube and, are therefore, compared to an ideal capacitor of 8000 pf., or dashed line 111.

The capacitor of FIGS. 1, 2 and 3 performs in accordance with heavy dashed-dot line 116, which may be observed to be better than ideal from a frequency of 10 megacycles to over 1000 megacycles. This improvement may be largely attributed to the use of ferrite, as the capacitor sections of FIGS. 1, 2 and 3 with the ferrite omitted perform in accordance with the heavy solid line 117, which may be seen to have a substantially higher transfer impedance between 10 and 1000 megacycles.

The previously described principles of electrode interruption and ferrite placement may be applied in conjunction with lumped circuit elements to provide extremely effective filter units. One such unit is illustrated in axial section in FIG. 10 and comprises, generally, double two-section ferrite inside tubular capacitors arranged axially with an inductance disposed therebetween. Referring to the details of the drawing, this unit may be seen to comprise an upper ceramic tube 120 having a continuous exterior electrode 121 peripherally disposed and intimately bonded to the ceramic tube. Two similar electrodes are disposed on the interior periphery of the tube, a lower electrode 122 and an upper electrode 123 having axial length relationships of 1 to 1.5 for the reasons previously set forth. A second, identical two-section capacitor is disposed below and in co-axial relationship with the former and comprises a ceramic tube 125, exterior electrode 126 and interior electrodes 127 and 128. In this instance the separate condenser units are on individual ceramic tubes spaced apart as at 129 to dampen solid body resonance effects.

Figure 10:
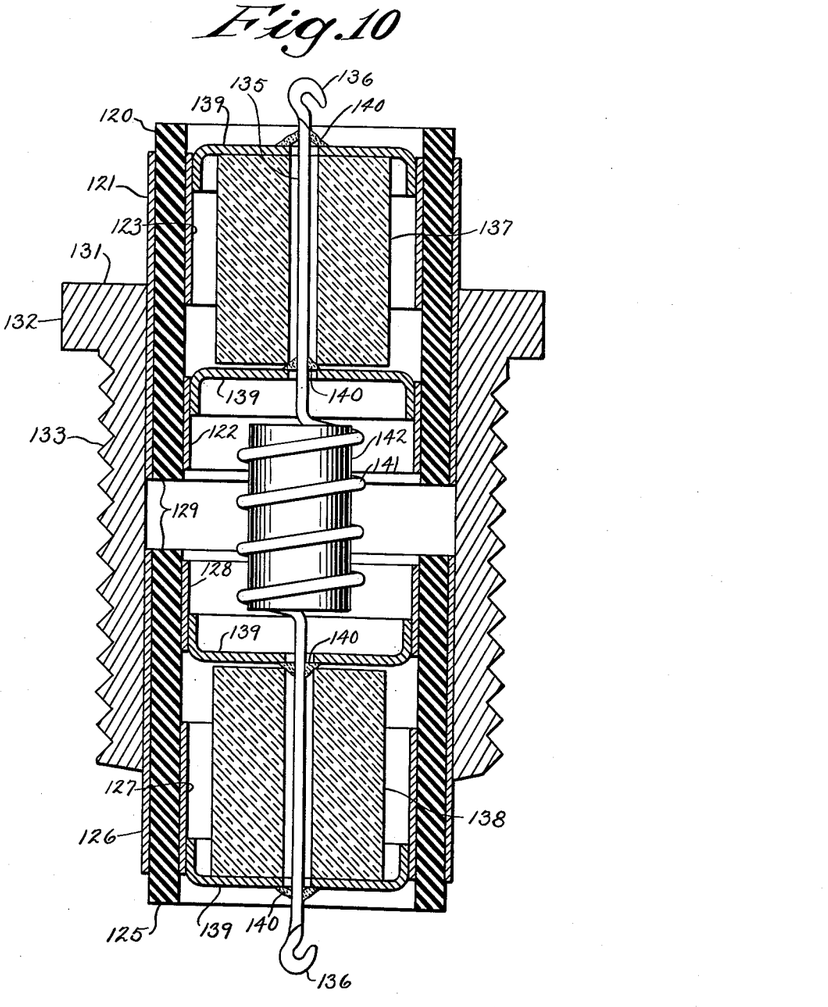
FIG. 10 is an axial sectional view of a pi section network utilizing the principles of the invention.

The condenser units are structurally maintained in the aforesaid position by being rigidly secured to a metallic sleeve 131 fixed by an adhesive or soldered to a portion of exterior electrodes 121 and 126. Both exterior electrodes are also electrically connected to the sleeve 131, whereby it becomes a common grounding means for all capacitor sections. The aforesaid sleeve is adapted for affixation to a metal chassis by means of a flange 132 and screw threads 133 which receive a nut (not shown) for clamping the entire unit in cooperation with flange 132.

A feed-through conductor 135 passes axially through the unit, and is provided at its upper and lower ends with solder lugs 136 for attachment to the circuit with which it is used. Disposed about a part of the upper and lower portions of feed-through conductor 135 are cylindrical ferri-magnetic slugs 137 and 138. These slugs are maintained rigidly in position by means of metallic spiders 139 disposed in electrical contact with one each of the four internal capacitor electrodes. Electrical contact between each spider and the central feed-through wire is provided as at 140 by a solder bead.

A portion of the medial region of feed-through conductor 135 is wound into an inductance at 141, which may be a self-supporting air wound inductance or it may have a powdered iron core, for example, as shown at 142.

The foregoing is an example only of many combinations of circuit elements that may be grouped together unitarily to provide any desired network to meet particular circuit requirements.

Figure 12:
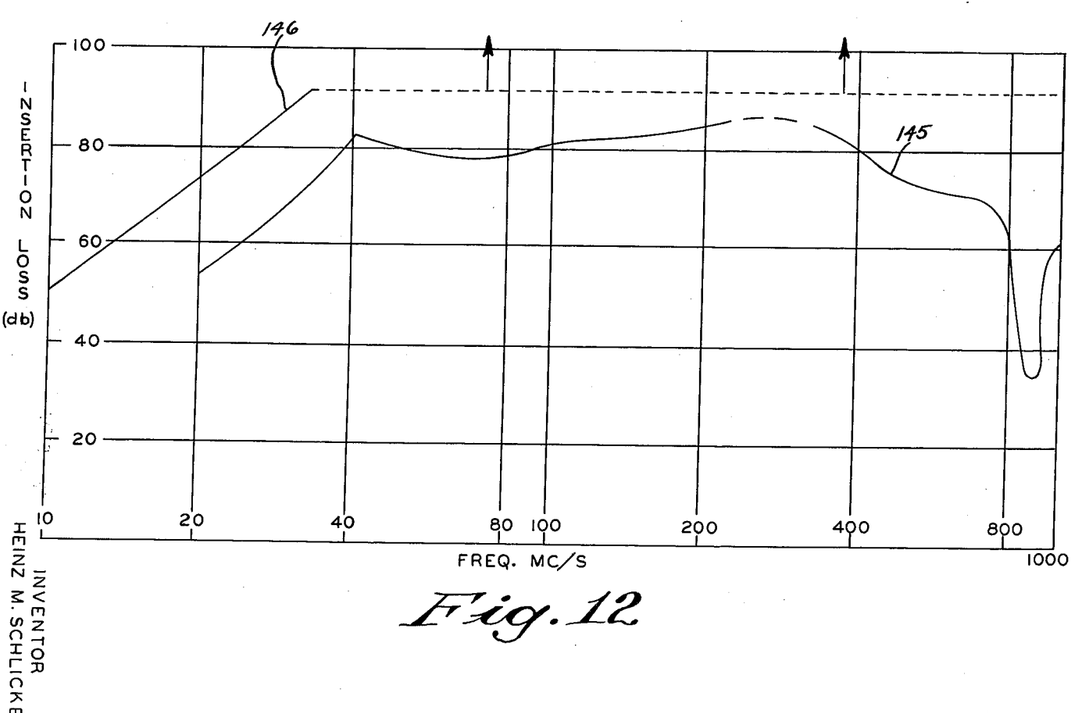
FIG. 12 is a graph of insertion loss versus frequency for the embodiment of FIG. 10 compared with similar values for previous pi section networks.

For comparison purposes, FIG. 12 is a graph of insertion loss in decibels plotted against frequency in megacycles for the filter unit of FIG. 10, compared with a previous feed-through filter unit comprising straight forward tubular capacitors without ferrite cylinders, spaced apart with an inductance arranged therebetween. The curve 145 illustrates the performance of this prior construction which may be observed to be erratic above about 200 megacycles, and exhibits an undesirably low insertion loss at frequencies above 400 megacycles. In contrast, the performance of the unit of FIG. 10 (curve 146) shows an insertion loss so high that from above about 35 megacycles its loss cannot be measured, because sufficient power cannot be introduced to the unit to provide a measurable output reading.

The foregoing illustrative embodiments are indicative only of the many forms in which the present invention may be practiced. The selection of mounting means may be varied to meet specific requirements and the principles of the invention are equally applicable to stand-off capacitors, feed-through capacitors, printed circuit components and various filter networks. Accordingly, the scope of the invention should be determined from the following claims rather than from the embodiments selected for illustrative purposes.

I claim:

1. A feed-through capacitor for use at high frequencies comprising a ceramic dielectric tube having an intimately adherent metallic electrode disposed on one of the cylindrical surfaces thereof and a plurality of intimately adherent electrodes in capacitive relationship therewith on the other cylindrical surface, said last mentioned electrodes being of unequal axial length and spaced apart to leave an axially extending band of the ceramic tube surface exposed, a ferrite body disposed axially along a portion of the tube and in inductive relationship with the exposed ceramic surface, said ferrite body loading the capacitor whereby the high frequency transfer impedance of the capacitor is materially reduced.

2. A capacitor in accordance with claim 1 in which the ferrite body is disposed on the inside of the tube.

3. A capacitor in accordance with claim 1 in which the ferrite body is disposed on the outside of the tube.

4. A feed-through capacitor for use at high frequencies comprising a unitary titanate ceramic dielectric tube having an intimately adherent metallic electrode disposed on one of the cylindrical surfaces thereof and a plurality of intimately adherent electrodes on the other cylindrical surface, said electrodes comprising silver containing a substantial portion of a ferrite material.

5. A feed-through capacitor in accordance with claim 4 in which the silver contains approximately forty percent by weight of a ferrite material.

6. A feed-through capacitor for use at high frequencies comprising a unitary ceramic tube having an intimately adherent metallic layer disposed on one of the cylindrical surfaces thereof and three intimately adherent electrodes on the other cylindrical surface, said electrodes being spaced apart to leave axially extending bands of the ceramic tube exposed between adjacent electrodes, the axial length ratios of the electrodes being approximately 1 to 1.5 to $(1.5)^2$.

7. A feed-through capacitor for use at high frequencies comprising a ceramic tube of high dielectric constant having an electrode layer on its inner cylindrical surface and a plurality of axially extending electrode layers on its outer surface, said last mentioned electrode layers having their adjacent edges spaced apart to leave an axially extending band of the outer ceramic tube surface exposed; a tubular ferrite body disposed about said ceramic tube in coaxial relationship therewith and having its inner surface adjacent the outer electrode layers.

8. A feed-through capacitor according to claim 7 in which the outer cylindrical surface and the annular end surfaces of the ferrite body are covered with a metalized, electrically conductive layer.

9. A feed-through capacitor according to claim 8 in which the annular end surfaces of the ceramic tube are covered with a metalized, electrically conductive layer, one of said layers being in electrical contact with the inner electrode of the ceramic tube.

10. Apparatus according to claim 8 having an electrically conductive mounting strap encircling a portion of the ferrite body and in electrical contact therewith, said strap being adapted for mechanical attachment to a chassis whereby the capacitor may be used as a "stand-off" capacitor.

References Cited in the file of this patent

UNITED STATES PATENTS

| | | |
|---|---|---|
| 2,016,303 | Sprague | Oct. 8, 1935 |
| 2,383,890 | Robinson | Aug. 28, 1945 |
| 2,464,377 | Cohen et al. | Mar. 15, 1949 |
| 2,541,749 | De Lange | Feb. 13, 1951 |
| 2,688,177 | Wagner | Sept. 7, 1954 |
| 2,759,155 | Hackenberg | Aug. 14, 1956 |
| 2,787,767 | Goldsmith | Apr. 2, 1957 |

FOREIGN PATENTS

| | | |
|---|---|---|
| 161,585 | Australia | Mar. 1, 1955 |
| 538,175 | Belgium | May 31, 1955 |
| 534,252 | Italy | Oct. 13, 1955 |
| 1,117,919 | France | Mar. 5, 1956 |

OTHER REFERENCES

Schlicke: Proceeding of the IRE, vol. 44, No. 5, May 1956, pages 686–691.